M. HALPERN ET AL

May 24, 1932.

NECKTIE

Re. 18,481

Original Filed April 18, 1930

Inventor

MAX HALPERN
WILLIAM MAYER.

By Clarence A. O'Brien

Attorney

Reissued May 24, 1932 Re. 18,481

UNITED STATES PATENT OFFICE

MAX HALPERN, OF NEW YORK, AND WILLIAM MAYER, OF BROOKLYN, NEW YORK

NECKTIE

Original No. 1,803,249, dated April 28, 1931, Serial No. 445,380, filed April 18, 1930. Application for reissue filed September 11, 1931. Serial No. 562,386.

This invention relates to improvements in neckties, and more particularly it pertains to the manufacture of neckties of the made-up type.

It is an object of the invention to provide a novel lining about which suitable material may be formed to provide a tie of the desired type.

It is a further object of the invention to provide a novel lining for bow ties, which will maintain the bow loop of the tie in proper extended position to maintain a neat appearance at all times.

The invention will be clearly understood from the accompanying drawings, and the following detailed description of the construction therein shown.

Referring to the accompanying drawings,—

Referring specifically to the drawings, the numeral 10 designates the bow of a necktie, and 11 designates the conventional neckband thereof.

The bow 10 is formed about a lining, as illustrated in this application, and said lining consists of a substantially rectangular body portion 12 of semi-rigid material such, for example, as buckram.

Figure 1:
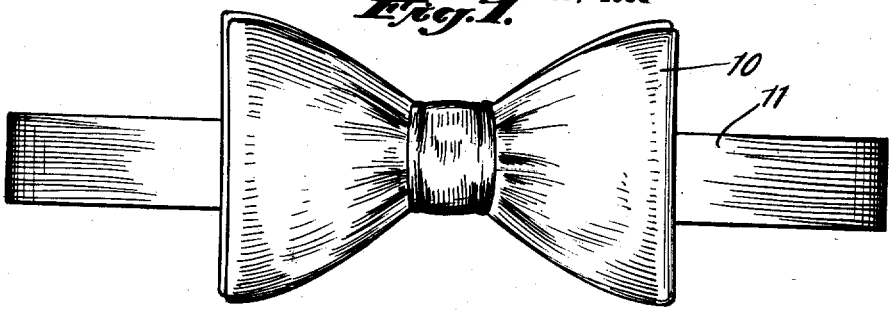
Figure 1 is a view, in elevation, of a bow type necktie constructed in accordance with the present invention.
Figure 2:
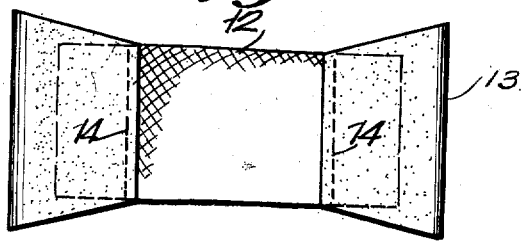
Figure 2 is a view, in elevation, of one form of lining.
Figure 3:
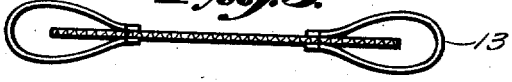
Figure 3 is an edge view of the lining shown in Figure 2.

Means is provided to at all times maintain the loops of the bow 10 in extended position; and in the form of the invention illustrated in Figures 2 and 3, this means comprises looped sections 13 of a suitable elastic material, and relatively thin sheet rubber has been found very adaptable for this purpose. Sections of such rubber are cut to desired shapes and size, after which they are folded upon themselves and secured to the ends of the body portion 12 by stitching, stapling, or in any other suitable manner, as indicated at 14 in said Figures. In securing the looped sections 13 to the body portion 12 of the lining, the ends of the body portion occupy positions within their respective looped sections, the point of attachment of each looped section to the body portion being slightly spaced from its respective end thereof.

Figure 4:
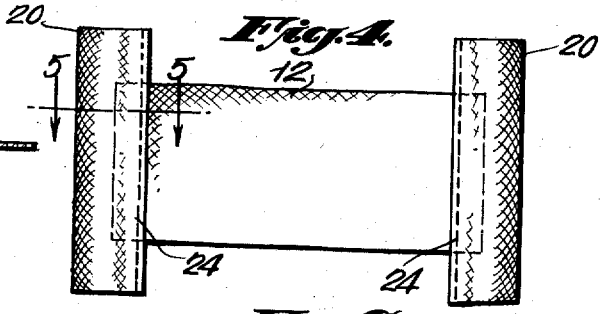
Figure 4 is a plan view of a slightly modified form of lining.
Figure 5:
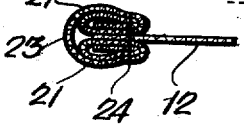
Figure 5 is a detail view of a portion of the lining shown in Figure 4, and taken on the line 5—5 thereof.

In that form of the invention illustrated in Figures 4 and 5, the loop-extending members are designated 20, and in this form of the invention these members are of relatively long, narrow form; extend transversely of the body portion 12 of the lining; and are preferably of a relatively soft or pliable material such as a knitted fabric. These members 20 are preferably formed by folding inwardly two opposed side edges of a blank of suitable material, thus forming two rolled portions 21 connected together by a looped portion 23, as illustrated in Figure 5. The members 20 are secured to the body portion 12 by positioning the latter between the rolls 21, after which they may be secured together by stitching, stapling, or the like, such as 24; and said fastenings 24 preferably extend throughout the entire length of the members 20 to prevent unrolling of the rolled portions thereof.

Figure 6:
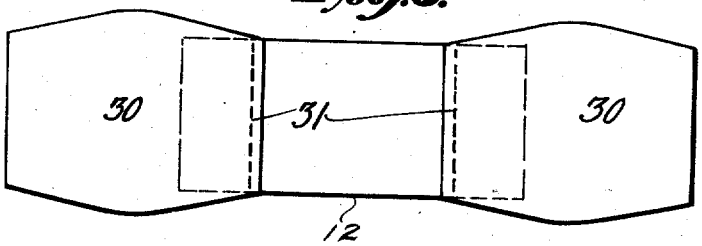
Figure 6 is a plan view of a still further modified form of lining.
Figure 7:
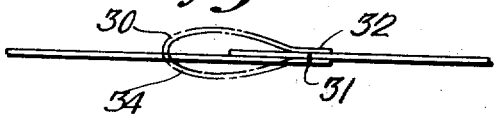
Figure 7 is a detail view, partly broken away, of that form of lining shown in Figure 6.

In that form of the invention illustrated in Figures 6 and 7, the looped extending members are designated by the numeral 30. These members 30 are preferably formed from elastic material, as in the form illustrated in Figures 2 and 3. In this form illustrated in Figures 6 and 7, however, the bow-extending members are secured at one of their ends only to the body portion 12, as indicated at 31. The free end 32 of these members, when they are formed into loops 34, as indicated in dotted line in Figure 7, engages the body portion 12 upon the opposite face to which the members are secured, and preferably the free ends 32 are movable with relation to said body portion.

While the invention has been herein shown in what is at present considered its preferred forms, it is obvious that it may be practiced in various other forms which fall within the scope of the appended claims.

Having thus described our invention and illustrated its use, what we claim as new and desire to secure by Letters Patent is—

1. A form for use in the manufacture of made-up neckties of bow form, comprising a substantially rectangular body portion, an elongated bow-loop-forming member secured to each end of said body portion, and extending transversely thereof, said bow-loop-forming members each comprising a relatively soft material rolled upon itself into elongated form.

2. A form for use in manufacturing made-up-neckties of bow form, comprising a substantially rectangular body portion, an elongated bow-loop-forming member secured to the ends of said body portion, and extending transversely thereof, said bow-loop-forming members each comprising a piece of relatively soft material rolled from opposite sides inwardly of the body portion and embracing the ends of the rectangular body.

3. A form or lining for use in the manufacture of made-up neckties of bow form; comprising a substantially rectangular body portion, an elongated bow-loop-forming member secured to the ends of said body portion, and extending transversely thereof, said bow-loop-forming members each comprising a piece of relatively soft material rolled from opposite sides inwardly of the body portion and embracing the ends of the rectangular body, with a rolled portion disposed upon each of the opposite sides of said rectangular body.

4. In a ready-made bow tie, an outer casing of tie material defining opposite wings of the tie, a pair of soft and pliable and resilient, rod-shaped insert members arranged transversely in opposite ends of the casing, respectively, and adapted to impart an apparent fullness and relative rigidity to the end edges of the tie wings, each of said members comprising soft, resilient sheet material rolled upon itself into elongated, rod-shaped form, and non-metallic means for retaining said insert members in positions closely adjacent to the end edges of the tie wings.

5. In a ready-made bow tie, an outer casing of tie material defining opposite wings of the tie, a non-metallic lining element in the casing, a pair of soft and pliable and resilient, rod-shaped insert members arranged transversely in opposite ends of the casing, respectively, and adapted to impart an apparent fullness and relative rigidity to the end edges of the tie wings, and means at the opposite ends of said lining element including stitches through said element for engaging said insert members, respectively, and thereby maintaining them in position.

6. In a ready-made bow tie, an outer casing of tie material defining opposite wings of the tie, a non-metallic lining element in the casing, a pair of soft and pliable and resilient, rod-shaped insert members arranged transversely in opposite ends of the casing, respectively, and adapted to impart an apparent fullness and relative rigidity to the end edges of the tie wings, each of said members comprising soft, resilient sheet material rolled upon itself into elongated rod-shaped form, and means including stitches through said lining element for securing said members to opposite ends of said lining element respectively.

7. A form for use in the manufacture of a made-up bow necktie, comprising a flat body portion of non-metallic, creasable sheet material, and an elongated, form-retaining, resilient, bow-loop-forming member associated with each end of said body portion and extending transversely thereof, each of said members comprising soft and pliable, resilient sheet material rolled into a substantially compact, elongated body, and said form in its entirety conforming substantially to the symmetrical, wing-shaped configuration of the bow tie to be formed thereover.

8. In a ready-made bow tie, an outer casing of tie material defining opposite wings of the tie, a non-metallic, creasable lining element in the casing, a pair of soft and pliable and resilient, rod-shaped insert members arranged transversely in opposite ends of the casing, respectively, and adapted to impart an apparent fullness and relative rigidity to the end edges of the tie wings, each of said members comprising soft sheet fabric rolled upon itself into elongated, rod-shaped form, and stitching for securing said members to opposite ends of said lining element, respectively.

In witness whereof we have signed this specification this 3rd day of September, 1931.

MAX HALPERN.
WILLIAM MAYER.